United States Patent
Bevilacqua et al.

[15] 3,656,074
[45] Apr. 11, 1972

[54] CONTROL ROD POSITION TRANSMITTER

[72] Inventors: Frank Bevilacqua, Windsor; Herbert A. Runde, Windsor Locks, both of Conn.

[73] Assignee: Combustion Engineering, Inc., Windsor, Conn.

[22] Filed: Nov. 14, 1968

[21] Appl. No.: 775,638

[52] U.S. Cl. .................... 335/206, 176/19 R, 340/188 R
[51] Int. Cl. ................................................ H01h 36/02
[58] Field of Search ............... 335/205, 206, 207; 176/19; 340/181, 188, 197, 282; 73/313, 319

[56] References Cited

UNITED STATES PATENTS

| | | | |
|---|---|---|---|
| 3,200,645 | 8/1965 | Levins | 335/206 UX |
| 3,217,307 | 11/1965 | Fogelquist | 340/188 |
| 3,437,771 | 4/1968 | Nusbaum | 335/206 X |

Primary Examiner—Bernard A. Gilheany
Assistant Examiner—R. N. Envall, Jr.
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

Apparatus for sensing and transmitting, to an indicating means, the position of a movable member comprising a magnet which moves with the member, a plurality of flux responsive switches individually positioned along a line parallel to the path of movement of the member, and a potentiometer electrically connected to the switches to provide a signal commensurate with the position of the member. The signal may then be transmitted to a position indicating device.

14 Claims, 6 Drawing Figures

INVENTOR.
FRANK BEVILACQUA
H. A. RUNDE
BY C. F. Bryant
ATTORNEY

INVENTOR.
FRANK BEVILACQUA
H. A. RUNDE
BY C. F. Bryant

ATTORNEY

CONTROL ROD POSITION TRANSMITTER

BACKGROUND OF THE INVENTION

The present invention relates to the providing of an indication of the position of a movable member. More particularly, the present invention is directed to apparatus for sensing and transmitting a signal indicative of the position of a movable member relative to a fixed structure within which the member moves. Accordingly, the general objects of the present invention are to provide new and improved methods and apparatus of such character.

While not limited thereto in its utility, the present invention is particularly well suited to the monitoring of the position of a control rod in a nuclear reactor. As is well known, in the case of a nuclear reactor portions of the structure are normally isolated and sealed off to prevent exposure of operating personnel to dangerous amounts of radiation. Accordingly, the positioning of elements such as the control rods for a reactor must be performed from a remotely located, central control station. Complicating matters is the fact that the control rods themselves must be positioned within sealed housings which extend from the main body of the reactor structure. Obviously, the less communication from the exterior to the interior of the control rod housing the better and thus conventional position indicating apparatus is not suitable for control rod position monitoring. Theoretically, a hermetically sealed control rod drive, including drive motor, is to be preferred and the industry trend is to adopt such drives. However, with the hermetically sealed drive, there is nothing extending out of the control rod housing to provide an indication of where the rod is positioned. Further even with present day practice where the drive motor is positioned externally of the control rod housing and communicates with the control rod drive through specially designed drive shaft seals, control rod position cannot be monitored without providing for the the passage of a plurality of electrical conductors through the housing so as to provide communication with sensing devices which are mounted on the control rod or its drive structure.

The monitoring of control rod position in a nuclear reactor is further complicated by the fact that the control rod is typically submerged in a fluid and during operation of the reactor the temperature of this fluid and of the rod itself becomes quite high. The design of position monitoring means is thus complicated by the facts that, if portions thereof are to be physically affixed or connected to the control rod as has been past practice, such portions of the position indicating apparatus must be capable of withstanding high temperatures and must be able to operate while submerged in a fluid such as water. These restrictions have previously confined control rod position monitoring equipment designers to working with mechanical or electromechanical components which are suitable for use within the control rod housing. This limiting of flexibility of design has, in turn, required the undesirable communication between the interior and exterior of the control rod housing mentioned above. In addition, in the case of a failure in the monitoring apparatus, repair thereof required a lengthy shut down of the reactor.

SUMMARY OF THE INVENTION

In application No. 659,700 filed Aug. 10, 1967 by J. H. Comeau and W. H. Zinn and assigned to the same assignee as the present invention, there was described a position indicating apparatus which enables the position of a movable member, such a nuclear reactor control rod drive, to be accordingly monitored without the necessity of providing communication between the interior and exterior of the housing in which the movable member is situated. The system described therein included a magnet affixed to and traveling with the reactor control rod drive, a nonmagnetic housing about the control rod drive mechanism, and a series of axially aligned flux responsive reed switches located immediately outside the drive mechanism housing and extending in a direction parallel to the control rod drive. As an individual flux responsive switch was actuated by the magnet passing in proximity to it, an electrical signal was derived from a potentiometer to which a lead of the switch was connected. As each switch was located at an incrementally different position along the direction of travel of the control rod and as each switch had one lead connected to an incrementally different location on the potentiometer, the resultant signal on the opposite lead of each switch, when actuated, would be indicative of a distinct control rod position. Position indicating means, responsive to the signal provided by the potentiometer through the flux responsive switch, were used to provide an indication (usually visual) of the control rod position.

The apparatus of the above mentioned application, while providing a significant advance in the art, has several limitations. Firstly, the magnet was effective in closing but a single switch at any location in its travel, with such switch being released before the next switch is actuated. This required a position indicating means which would "remember" the last switch actuated in instances when the control rod would be stopped in a location such that no switch is actuated. We have found that such means are expensive and unnecessary. Secondly, the apparatus was constructed such that a multitude of conducting wires ran from the incrementally positioned switches to their respective tap points on an incremental potentiometer which was removed from the proximity of the switches. We have found that such an arrangement is cumbersome and unnecessary.

In accordance with the present invention, a control rod position transmitter is provided which obviates the need to "remember" a prior location. Further, a system of increased reliability is obtained. Still further we have developed a position transmitter of extreme simplicity requiring but few electrical connections to exterior circuitry and being readily removable from the area of the drive mechanism for purposes of maintenance and inspection.

The foregoing and other improvements precipatated by the present invention are provided by apparatus which includes a permanent magnet which is physically positioned on the movable member, such as a control rod drive. The apparatus also includes a plurality of magnetic flux responsive devices which are positioned exteriorly to the control rod housing, said devices being positioned along a line parallel to the path of movement of the control rod and its drive. As the control rod moves, the devices are individually energized. A voltage divider or other suitable source of electrical signals is associated with, and in proximity to, the flux responsive devices such that a signal commensurate with the position of the control rod will be provided to an indicating apparatus. The flux responsive devices and the voltage divider or other suitable source of electrical signals are located within a nonmagnetic housing which is in turn removably mounted adjacent the exterior wall of the control rod housing in proximity with the path of the magnet. The flux responsive devices and the voltage divider are positioned and interconnected to obtain a position transmitter which will provide a continuous signal indicative of a distinct incremental position and in a manner requiring very few electrical connections between the transmitter housing and the extraneous apparatus such as the position indicating means and the power supply.

BRIEF DESCRIPTION OF THE DRAWINGS

The present invention may be better understood and the foregoing and other numerous advantages resulting therefrom will be obvious to those skilled in the art by reference to the accompanying drawings wherein like reference numerals refer to like elements in the various figures and in which.

DESCRIPTION OF THE PREFERRED EMBODIMENT

Figure 1:
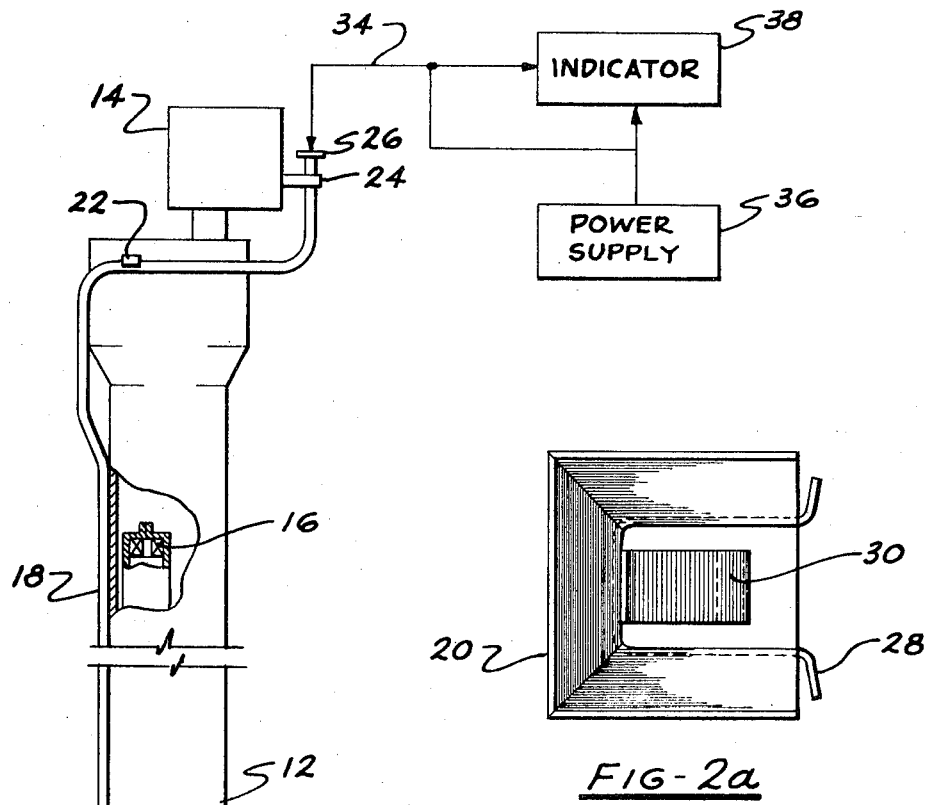
FIG. 1 depicts the present invention installed on a control rod housing of a nuclear reactor.

Referring now to FIG. 1 a portion of a nuclear reactor is indicated generally at 10. Extending upwardly from the top of reactor 10 are a plurality of control rod housings, only one of which is shown generally at 12. Control rod housing 12 will typically be a nonmagnetic stainless steel tube which is 5 inches in diameter and has a 1 inch thick wall. The control rod drive is situated within housing 12 and the control rod itself extends into the main portion of reactor 10. In the case where reactor 10 is employed for the heating of water in an electrical power generating application, housing 12 will be filled with water and the temperature within housing 12 may reach as high as 500° F.

A control rod drive motor 14 is mounted above a cap which seals the upper end of tube 12. Through appropriate gearing, a motor 14 causes a control rod drive to move axially of housing 12 thus adjusting the position of the control rod relative to the reactor core. The drive shaft of motor 14 communicates with the interior of housing 12 through specially designed seals which are available commercially. In the embodiment of FIG. 1, the drive shaft of motor 14 provides the only communication between the interior and exterior of housing 12. It will also be noted that, in accordance with the present invention, it is possible to employ a submergible type of control rod drive motor and thus motor 14 could be located within housing 12 and the control housing hermetically sealed.

Permanent magnet 16 is mounted on the control rod drive inside of housing 12. The operating environment in the example being described requires that magnet 16 be comprised of a material whose magnetic properties are not affected by high temperatures. In addition, the magnet must be sufficiently strong so that its flux field will bridge the thick stainless steel walls of housing 12. In one installation magnet 16 comprised an Alnico disc. Access to magnet 16 in case replacement becomes necessary is by means of a removable cap in the top of housing 12.

The portion of the position transmitting apparatus of the present invention which is mounted on the exterior of housing 12 and cooperates with magnet 16 is contained within transmitter housing 18. Housing 18 comprises an elongated hollow member, generally of tubular form, comprised of a nonmagnetic material which preferably has a high coefficient of thermal conductivity. Housing 18 of FIG. 1 has a lower portion which is straight and contains the transmitting circuitry of the invention and is located parallel to the path of magnet 16. This portion of housing 18 is mounted adjacent the outer wall of control rod housing 12 in a location which permits maximum magnetic coupling. Such a location will normally be adjacent the path of travel of magnet 16 along the outer surface of housing 12.

Because it is desirable to support the upper portion of housing 18 at a location which is accessible and because the external electrical connections occur at that location, a bending of the housing 18 about a portion of the outer periphery of control rod housing 12 may be required. In the embodiment of FIG. 1 the magnet 16 is disposed within housing 12 at a location which is circumferentially opposite the aforementioned desired position for mounting the upper end of housing 18, and thus a circular 180° bend of housing 18, in a plane perpendicular to the straight portion of said housing 18, is required.

Housing 18 is supported in a manner permitting relatively simple installation and removal thereof. The lower end of housing 18 is received in, and supported by, scabbard 20 and is urged upwards against retainer 22 by spring means located within said scabbard. Retainer 22 may be substantially semicircular in shape and mounted to control rod housing 12 in a manner permitting retaining engagement with the transversely extending portion of housing 18. A third mounting clip 24 engages housing 18 near its upper end and may be easily removed for release and removal of housing 18.

The upper end of housing 18 is adapted to receive an electrical connector 26. Connector 26 provides means for connecting the position transmitter circuitry with external circuitry in a manner which permits removal of said connector from housing 18.

Figure 2A:
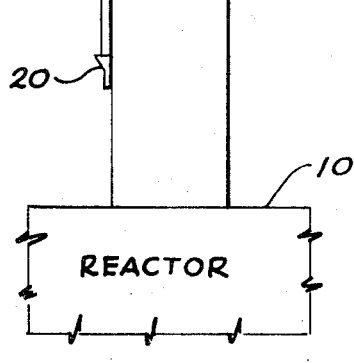
FIG. 2a is a plan view of the transmitter housing scabbard.
Figure 2B:
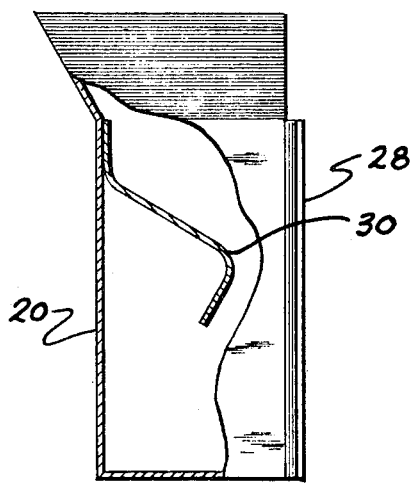
FIG. 2b is a side view of the transmitter housing scabbard having a portion of the scabbard cut away.

Referring now to FIGS. 2a and 2b there are shown, respectively, a top view and a cut away side view of scabbard 20. Scabbard 20 is designed to receive and support housing 18 regardless of its cross sectional shape. Scabbard 20 is mounted on control rod housing 12 by means of flanges 28 shown in FIGS. 2a and 2b. Spring 30 is affixed to and located within scabbard 20 and urges housing 18 up against retainer 22 when said housing is in the mounted position. To remove housing 18 from its mounted position, one need only release clip 24 and press downward on housing 18 to disengage it from retainer 22. The housing 18 will then be free for removal and may be remounted by reversing the operation.

Figure 3A:
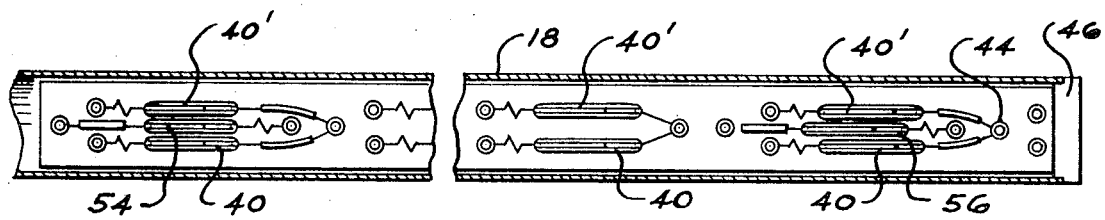
FIG. 3a is a plan view of the transmitter housing and included circuitry wherein a portion of the housing is cut away.
Figure 3B:
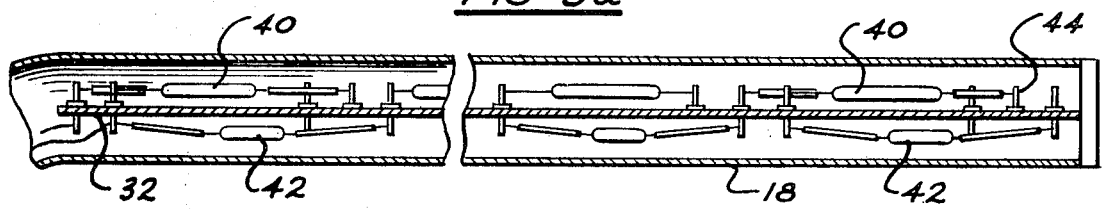
FIG. 3b is a side view of transmitter housing and included circuitry with a portion of the housing cut away.

FIGS. 3a and 3b respectively, show top and side views of the transmitter circuitry located within housing 18 through cut away portions of said housing. Shown within housing 18 is terminal strip 32 to which are mounted the flux responsive switches and the components of the incremental potentiometer of the position transmitter. Terminal strip 32 is of nonmagnetic material and is of such width that it snuggly engages the inner wall of housing 18 at its major diameter and is of sufficient length to accommodate the incrementally positioned flux responsive switches located parallel to the path of travel of the control rod. The use of terminal strip 32 as a circuit mounting member provides several advantages.

One advantage is realized through the interconnection of the flux responsive device and the potentiometer components in a common area within transmitter housing 18. This arrangement requires very few electrical connections between the position transmitter circuitry and the related circuitry. These connections are represented in FIG. 1 by means of cable 34 which is connected at one end to connector 26 and provides connections with power supply 36 and indicator 38. No more than seven electrical connections need be made to terminal strip 32 in providing the position transmitting function and this would include indications of upper and lower limit positions. Various transmitting circuit arrangements will be more thoroughly considered in the discussion of FIG. 4.

A second advantage is realized in the ease with which terminal strip 32 may be inserted into or removed from housing 18. Because the terminal strip consists of a flexible insulating material, it is easily positioned within housing 18 and insertion is obtained by blowing a string or other connecting line through housing 18, connecting it to terminal strip 32 and pulling the terminal strip into housing 18.

The flux responsive devices here shown as reed switches 40 and 40', and the components of the incremental potentiometer, here shown as resistors 42, are mounted to terminal strip 32 and electrically interconnected by means of stand off and feed through connectors 44. Care is taken to ensure that the length of stand off connectors 44 is not so great as to make electrical contact with the inner wall of housing 18. Further the leads of components 40, 40', and 42 may be insulated to prevent unwanted electrical contact. It will be realized that a terminal strip containing a printed circuit, rather than stand off connectors 44, may be used for component connection. When terminal strip 32 is inserted fully within housing 18, the lower end of said housing is capped by means of end cap 46 which both seals the housing end and provides a mounting support for the terminal strip within.

The reed switches 40 are spaced on terminal strip 32 at uniform incremental distances small enough to insure that at least one of said switches will be actuated for any location of the magnet. We have found that reed switches having a length of 1 inch, disposed in serially axial alignment parallel to the path of magnet 16, and having their ends separated by 1 inch from the next switch in the series provide an arrangement wherein a small overlap of switch actuation will occur, thus preventing the possibility of a control rod position at which no switch would be actuated. As the control rod drive travels axially of control rod housing 12, switches 40 will be sequentially closed at the approach of the field of magnet 16 and opened after it passes, with positioning of serially adjacent switches being such that two adjacent switches will be closed at such time as the magnet 16 is intermediate the two switches and its field actuates both.

Figure 4:
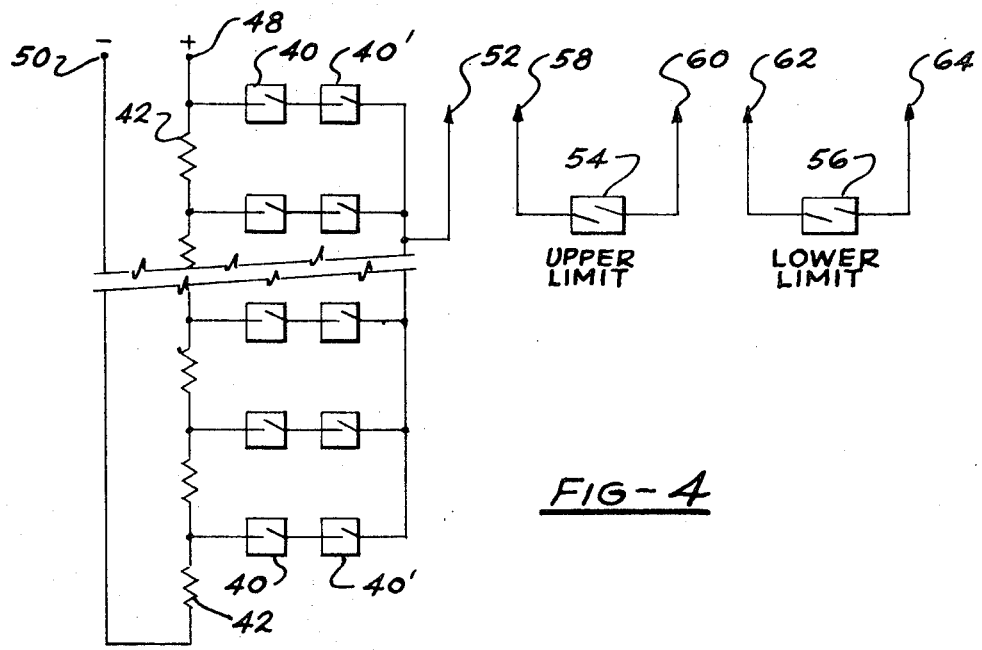
FIG. 4 is a schematic diagram of the electrical circuit of a preferred embodiment of the present invention.

Referring now to FIG. 4, the electrical portions of the present invention are shown schematically. A plurality of resistors 42 of the same size and type are connected at end points 48 and 50 across the power supply 36, not shown in FIG. 4, to form an incremental potentiometer or voltage divider. Reed switches 40' are electrically connected in series with each of switches 40 and are positioned in substantially the same locations as switches 40. Each of reed switches 40 is connected to a different point or tab on the voltage divider comprising resistors 42. All of the circuits comprising the series connected switches 40 and 40' are connected to a signal bus bar having a terminal point 52. Thus, upon the closing of one of switches 40 and its serially connected back up switch 40', a signal from the incremental potentiometer comprising resistors 42 will be applied to bus bar terminal 52. The amplitude of this signal indicates which of switch pairs 40 and 40' is at that instant subject to the field from magnet 16. In the instance when magnet 16 is intermediate the axial positioning of two adjacent incremental switch positions and the field actuates the switches at both incremental positions, the signal provided to the bus bar terminal 52 will have an amplitude intermediate the signals produced if either one of the two switches is actuated alone.

Thus we have provided a continuous, incrementally varying signal which is indicative of control rod position. This signal may then be provided to any indicating means 38 which is responsive to the signal provided. Indicator means as simple as a volt meter calibrate to represent control rod position may be used with the circuit described. One skilled in the art will recognize various systems which are capable of responding to the signal provided by the described position transmitter to provide continuous indication of control rod position, as by digital read out.

The availability of a continuous position indicating signal at bus bar terminal 52 allows the use of a signal responsive indicator having no position "remembering" capability, thereby greatly reducing the complexity and expense of such an indicator.

Back up switches 40', which are serially connected with switches 40 in each of the tap arms of the voltage divider, provide a redundancy function. If any switch 40 should fail in the closed position, switch 40' would allow proper continued operation of the transmitter. Failure of either switch 40 or 40' in the open position will serve to eliminate that incremental position from the position indicator, but the loss of a single position can be tolerated since the sensing of the control rod drive will be lost only in a region of approximately 3 inches along a total path of motion which may be as great as 12 feet.

In a preferred embodiment of the present invention a third reed switch was mounted adjacent each of the upper and lower extreme positions of reed switches 40 and 40'. These third, parallelly mounted switches, indicated as 54 and 56 respectively on FIG. 4, function as upper and lower limit switches for the control rod drive. Thus, when the control rod reaches either of its limits of longitudinal motion, one of switches 54 and 56 will be closed by the magnetic field of magnet 16. The closing of one of switches 54 and 56 will permit current flow to appropriate circuitry, not shown, for disabling or reversing drive motor 14 and energizing a visual or audible alarm.

If each of switches 54 and 56 has a pair of leads, as 58, 60, 62, and 64, which require connections to external circuitry through connector 26, the total number of electrical connections between terminal strip 32 and external circuitry would be no more than 7, as indicated above. However, those skilled in the art will recognize transmitter circuitry arrangements which would require even fewer external connections.

An arrangement wherein the external position indicator is capable of recognizing the signals provided by the upper and lower extremes of the incremental potentiometer as representing limit conditions will eliminate the need for discrete upper and lower limit switches and their electrical connections, thereby reducing the number of conducting paths to external circuitry by four. An extremely simple position transmitter, having but a single electrical connection with the external circuitry, might be had by connecting one end of the incremental potentiometer, consisting of resistors 42, to the housing 18 which could be at ground potential and allowing the other end of the potentiometer to remain floating. A single connection between the external circuitry and bus bar terminal 52 will then provide to an indicator, such as an ohmeter having one input connected to ground, a resistive value representative of control rod position. These are but two ways, in addition to that of our preferred embodiment, of providing a position transmitter of extreme simplicity and capable of providing a continuous signal indicative of control rod position to an indicating means.

While a preferred embodiment has been shown and described various modifications and substitutions may be made thereto without departing from the spirit and scope of the present invention. Accordingly, it is to be understood that the present invention has been described by way of illustration and not limitation.

What is claimed is:

1. Apparatus for transmitting the position of a movable member to an indicating means, said movable member being separated from at least part of said transmitting apparatus by a partition of nonmagnetic material, said transmitting apparatus comprising:
    a. magnet means, said magnet means being affixed to and moving with said movable member;
    b. a plurality of magnetic flux responsive electrical devices, said flux responsive devices being located on the opposite side of said partition from said movable member, said flux responsive devices being positioned along a line parallel to the path of motion of said movable member whereby said flux responsive devices will be sequentially energized and de-energized during travel of said magnet means with said movable member, said flux responsive devices being spaced from one another whereby at least one of said devices is always energized;
    c. means electrically connected to said plurality of flux responsive devices for providing signals indicative of the energization of said at least one of said flux responsive devices;
    d. nonmagnetic housing means for enclosing said flux responsive devices and said signal providing means;
    e. first support means attached to the opposite side of said partition from said movable member for removably supporting a first end of said housing means; and
    f. second support means for removably engaging a portion of said housing means remote from said first end.

2. The apparatus of claim 1 wherein said means for providing signals indicative of which of said at least one flux responsive devices is energized comprises:
    a. voltage supply means;
    b. means for generating a plurality of output voltages of different magnitude, said generating means being connected across said voltage supply means;
    c. means for applying said plurality of output voltages to first terminals of individual of said flux responsive devices; and
    d. means connected to second terminals of each of said flux responsive devices for providing a signal passed by said at least one energized device to an indication means responsive to said signal.

3. The apparatus of claim 1 wherein said first support means comprises:

a. a scabbard containing a spring therein, said spring acting to urge said housing means into engagement with said second support means.

4. The apparatus of claim 2 wherein said flux responsive devices comprise:
   a. reed relay switches.

5. Apparatus for transmitting the position of a movable member to an indicating means, said movable member being separated from at least part of said transmitting apparatus by a partition of nonmagnetic material, said transmitting apparatus comprising:
   a. magnet means, said magnet means being affixed to and moving with said movable member;
   b. a plurality of normally open magnetic flux responsive electrical switches, said flux responsive switches being located on the opposite side of said partition from said movable member, said flux responsive switches being positioned along a line parallel to the path of motion of said movable member whereby said flux responsive switches will be sequentially closed and re-opened during travel of said magnet means with said movable member;
   c. means electrically connected to said plurality of flux responsive switches for providing signals indicative of a closed one of said flux responsive switches;
   d. nonmagnetic housing means for enclosing said flux responsive switches and said signal providing means;
   e. first support means attached to the opposite side of said partition from said movable member for removably supporting a first end of said housing means; and
   f. second support means for removably engaging a portion of said housing means remote from said first end.

6. Apparatus for transmitting the position of a movable member to an indicating means, said movable member being separated from at least part of said transmitting apparatus by a partition of nonmagnetic material, said transmitting apparatus comprising:
   a. magnet means, said magnet means being affixed to and moving with said movable member;
   b. a plurality of magnetic flux responsive electrical devices, said flux responsive devices being located on the opposite side of said partition from said movable member, said flux responsive devices being positioned along a line parallel to the path of motion of said movable member whereby said flux responsive devices will be sequentially energized and de-energized during travel of said magnet means with said movable member, said flux responsive devices being spaced from one another whereby at least one of said devices is always energized;
   c. means electrically connected to said plurality of flux responsive devices for providing signals indicative of the energization of said at least one of said flux responsive devices;
   d. nonmagnetic housing means for enclosing said flux responsive devices and said signal providing means;
   e. a substantially rigid strip, having a length at least equal to the distance of travel of said movable member, said strip being removably located within said housing means and being of a width providing snug engagement of said strip with the inner surface of said housing means, said flux responsive devices and said signal providing means being electrically interconnected and mounted thereon; and
   f. mounting means for supporting and providing ready removal of said housing means.

7. The apparatus of claim 6 wherein said means for providing signals indicative of which of said at least one flux responsive devices is energized comprises:
   a. voltage supply means;
   b. means for generating a plurality of output voltages of different magnitude, said generating means being connected across said voltage supply means;
   c. means for applying said plurality of output voltages to first terminals of individual of said flux responsive devices; and
   d. means connected to second terminals of each of said flux responsive devices for providing a signal passed by said at least one energized device to an indication means responsive to said signal.

8. Apparatus for transmitting the position of a movable member to an indicating means, said movable member being separated from at least part of said transmitting apparatus by a partition of nonmagnetic material, said transmitting apparatus comprising:
   a. magnet means, said magnet means being affixed to and moving with said movable member;
   b. a plurality of normally open magnetic flux responsive electrical switches, said flux responsive switches being located on the opposite side of said partition from said movable member, said flux responsive switches being positioned along a line parallel to the path of motion of said movable member whereby said flux responsive switches will be sequentially closed and re-opened during travel of said magnet means with said movable member;
   c. means electrically connected to said plurality of flux responsive switches for providing signals indicative of a closed one of said flux responsive switches;
   d. nonmagnetic housing means for enclosing said flux responsive switches and said signal providing means;
   e. a substantially rigid member having a length at least equal to the distance of travel of said movable member, said member being removably located within said housing means and sized to provide snug engagement of said member with the inner surface of said housing means, said flux responsive switches and said signal providing means being electrically interconnected and mounted thereon; and
   f. mounting means for supporting and providing ready removal of said housing means.

9. Apparatus for transmitting, to indicating means, the position of a movable control rod in a nuclear reactor, said control rod including a drive portion moving therewith, said control rod and said drive portion being contained within a control rod drive housing of a nonmagnetic material, at least a part of said drive housing separating said transmitting apparatus from said rod and drive portion, said transmitting apparatus comprising:
   a. magnet means, said magnet means being affixed to and moving with said movable drive;
   b. an elongated, nonmagnetic tube, said tube being removably mounted on said drive housing and externally of said part of said drive housing separating said transmitting apparatus from said control rod and drive, and having at least a portion thereof being coextensive with and positioned along a line parallel to the path of motion of said movable drive;
   c. substantially rigid terminal strip means removably located within and snuggly engaging the inner wall of said tube and being coextensive with the path of travel of said movable drive;
   d. a plurality of normally open magnetic field responsive switch means, said switch means being mounted upon and positioned along said terminal strip means whereby said switch means will be sequentially closed and re-opened during travel of said magnet means with said movable drive;
   e. a voltage source;
   f. means for generating a plurality of output voltages of differing magnitude, said generating means being mounted upon said terminal strip means, said generating means being connected across said voltage source;
   g. means for applying individual of said plurality of output voltages to first terminals of individual of said switch means; and
   h. means connected to second terminals of each of said switch means for providing a signal passed by a closed switch means to an indication means responsive to said signals.

10. Apparatus for transmitting, to indicating means, the position of a movable control rod in a nuclear reactor, said control rod including a drive portion moving therewith, said control rod and said drive portion being contained within a control rod drive housing of a nonmagnetic material, at least a part of said transmitting apparatus being located externally of said control rod dive housing, said transmitting apparatus comprising:
   a. magnet means, said magnet means being affixed to and moving with said movable drive;
   b. an elongated, nonmagnetic tube, said tube being located externally of said drive housing and having at least a portion thereof being coextensive with and positioned along a line parallel to the path of motion of said movable drive;
   c. first and second support means affixed to said drive housing for supporting said tube, said first support means urging said tube into engagement with said second support means;
   d. terminal strip means, said terminal strip means snuggly engaging the inner wall of said tube and being coextensive with the path of travel of said movable drive;
   e. a plurality of magnetic field responsive switch means, said switch means being mounted upon and positioned along said terminal strip means whereby said switch means will be sequentially energized and de-energized during travel of said magnet means with said movable drive, said switch means being spaced from one another whereby at least one of said switch means is always energized;
   f. a voltage source;
   g. means for generating a plurality of output voltages of differing magnitude, said generating means being mounted upon said terminal strip means, said generating means being connected across said voltage source;
   h. means for applying individual of said plurality of output voltages to first terminals of individual of said switch means; and
   i. means connected to second terminals of each of said switch means for providing a signal passed by said at least one energized switch means to an indication means responsive to said signals.

11. The apparatus of claim 10 wherein each of said switch means comprises:
   a. a pair of reed relays, both relays occupying the same axial position along said line parallel to the path of said magnet means and electrically connected in series.

12. The apparatus of claim 11 wherein said means for generating a plurality of output voltages comprises:
   a. a voltage divider including a plurality of resistors.

13. The apparatus of claim 12 wherein said magnet means comprises:
   a. a permanent magnet.

14. The apparatus of claim 13, wherein said elongated, nonmagnetic tube comprises:
   a. a first straight portion housing said switch means and said output voltages generating means; and
   b. a second curved portion, said second portion having a circular bend of less than 180° in a plane perpendicular to said first straight portion.

* * * * *